US008816817B2

(12) United States Patent
Hama et al.

(10) Patent No.: US 8,816,817 B2
(45) Date of Patent: Aug. 26, 2014

(54) AUTHENTICATION APPARATUS

(75) Inventors: Soichi Hama, Kawasaki (JP); Mitsuaki Fukuda, Kawasaki (JP); Takahiro Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 728 days.

(21) Appl. No.: 12/564,464

(22) Filed: Sep. 22, 2009

(65) Prior Publication Data
US 2010/0085151 A1 Apr. 8, 2010

(30) Foreign Application Priority Data
Oct. 3, 2008 (JP) .................................. 2008-258951

(51) Int. Cl.
*G05B 19/00* (2006.01)

(52) U.S. Cl.
USPC ........ 340/5.82; 340/5.83; 340/5.84; 382/124; 382/125; 382/115

(58) Field of Classification Search
USPC .................... 340/5.52, 5.53, 5.83, 5.82–5.84; 382/115, 124, 125
See application file for complete search history.

(56) References Cited

U.S. PATENT DOCUMENTS

| | | | |
|---|---|---|---|
| 6,606,458 B2 | 8/2003 | Umeda et al. | |
| 7,110,580 B2 * | 9/2006 | Bostrom | 382/124 |
| 7,672,488 B2 * | 3/2010 | Miura et al. | 382/115 |
| 2004/0096086 A1 * | 5/2004 | Miyasaka et al. | 382/124 |
| 2005/0063567 A1 | 3/2005 | Saitoh et al. | |
| 2005/0089198 A1 * | 4/2005 | Ono et al. | 382/115 |
| 2006/0186987 A1 * | 8/2006 | Wilkins | 340/5.53 |
| 2007/0036399 A1 | 2/2007 | Matsumura et al. | |
| 2008/0001703 A1 * | 1/2008 | Goto | 340/5.8 |
| 2008/0056539 A1 | 3/2008 | Sweeney et al. | |
| 2008/0159599 A1 * | 7/2008 | Kajihara et al. | 382/115 |
| 2008/0211627 A1 * | 9/2008 | Shinzaki | 340/5.82 |
| 2009/0058595 A1 * | 3/2009 | Mainguet et al. | 340/5.53 |

FOREIGN PATENT DOCUMENTS

| | | |
|---|---|---|
| JP | 2000-293688 | 10/2000 |
| JP | 2002-071578 | 3/2002 |
| JP | 2002-183734 | 6/2002 |
| JP | 2003-058508 | 2/2003 |
| JP | 2003-75892 | 3/2003 |

(Continued)

OTHER PUBLICATIONS

Patent Abstracts of Japan, Publication No. 2004-164652, published Jun. 10, 2004.

(Continued)

*Primary Examiner* — George Bugg
*Assistant Examiner* — Sharmin Akhter
(74) *Attorney, Agent, or Firm* — Staas & Halsey LLP

(57) ABSTRACT

An apparatus for authenticating a user includes a detector for determining a state or a position of a bodily part placed by the user for biometric authentication, a unit capable of obtaining biometric data from a different portion of the bodily part, a plurality of biometric authentication engines capable of authenticating the user by using one of a plurality of authentication algorithms by comparing the biometric data with reference data, respectively, and a controller for selecting one of the different portions of the bodily part so as to select associated biometric data, and determining one of the biometric authentication engines for authenticating the user on the basis of the state or the position of the bodily part placed.

14 Claims, 14 Drawing Sheets

(56) References Cited

FOREIGN PATENT DOCUMENTS

| JP | 2004-139611 | 5/2004 |
|---|---|---|
| JP | 2004-164652 | 6/2004 |
| JP | 2006-65400 | 3/2006 |
| JP | 2006-153633 | 6/2006 |
| JP | 2006-285487 | 10/2006 |
| JP | 2006-304142 | 11/2006 |
| JP | 2007-179434 | 7/2007 |
| JP | 2007-328571 | 12/2007 |

OTHER PUBLICATIONS

Patent Abstracts of Japan, Publication No. 2003-058508, published Feb. 28, 2003.
Patent Abstracts of Japan, Publication No. 2000-293688, published Oct. 20, 2000.
Patent Abstracts of Japan, Publication No. 2002-183734, published Jun. 28, 2002.
Japanese Office Action issued Jun. 19, 2012 in corresponding Japanese Patent Application No. 2008-258951.
Patent Abstracts of Japan Publication No. 2006-304142, published Nov. 2, 2006.
Extended European Search Report dated Jun. 12, 2012 issued in corresponding European Patent Application No. 09171824.7.
Office Action issued by the Japanese Patent Office on Jan. 29, 2013 in the corresponding Japanese patent application No. 2008-258951.
Office Action issued by the Japanese Patent Office on Nov. 12, 2013 in the corresponding Japanese patent application No. 2008-258951.

* cited by examiner

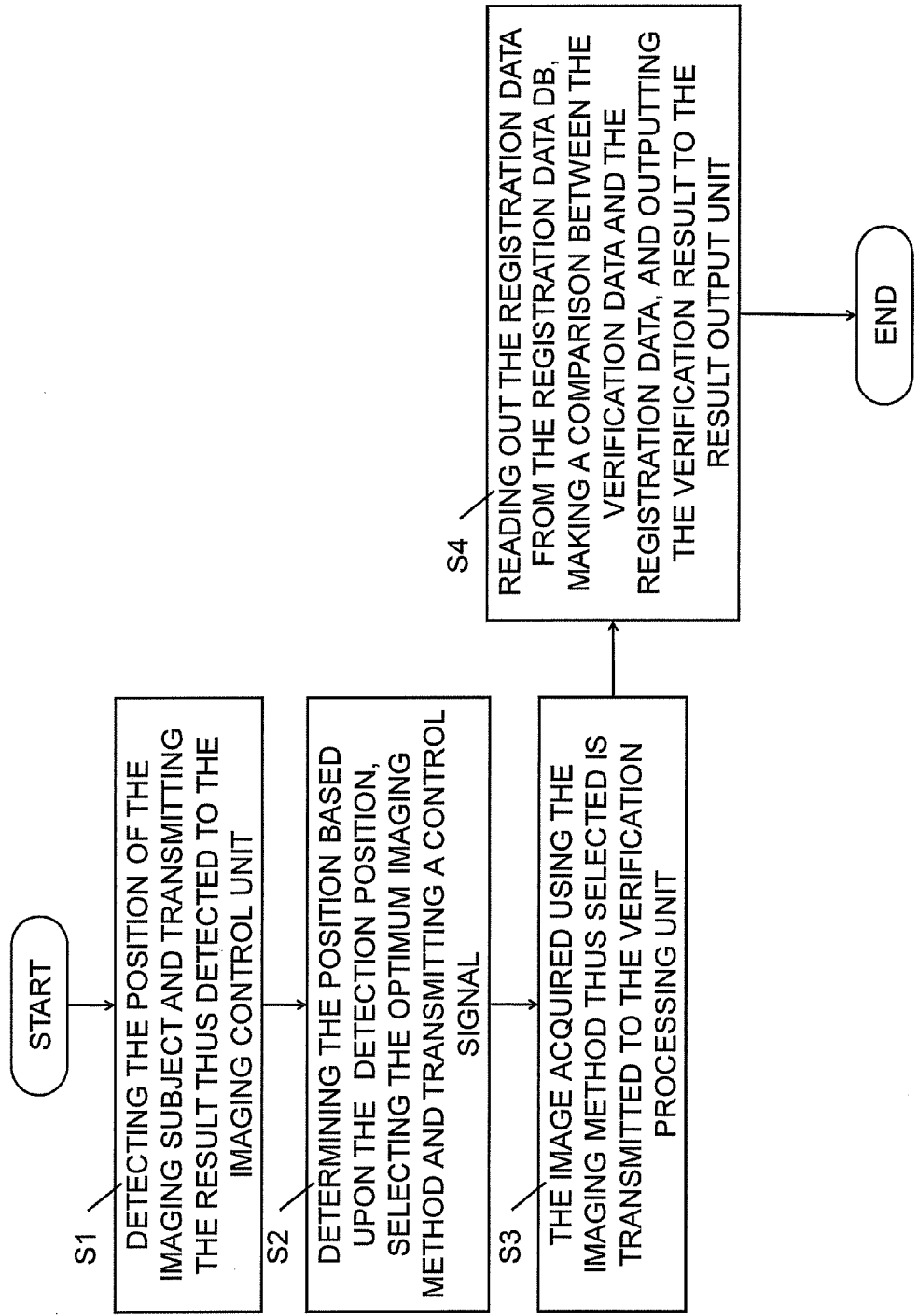

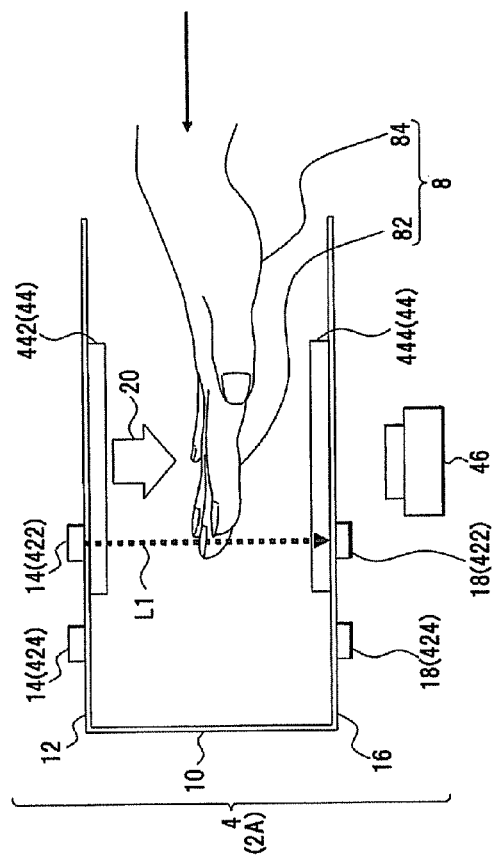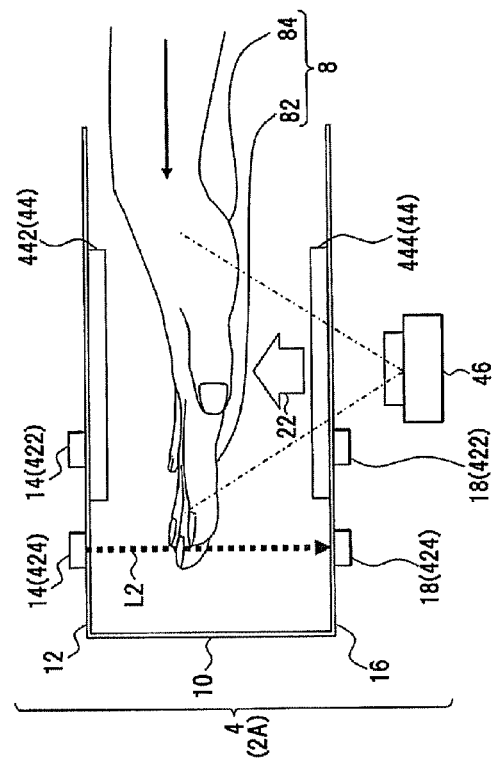
FIG. 3A
FIG. 3B

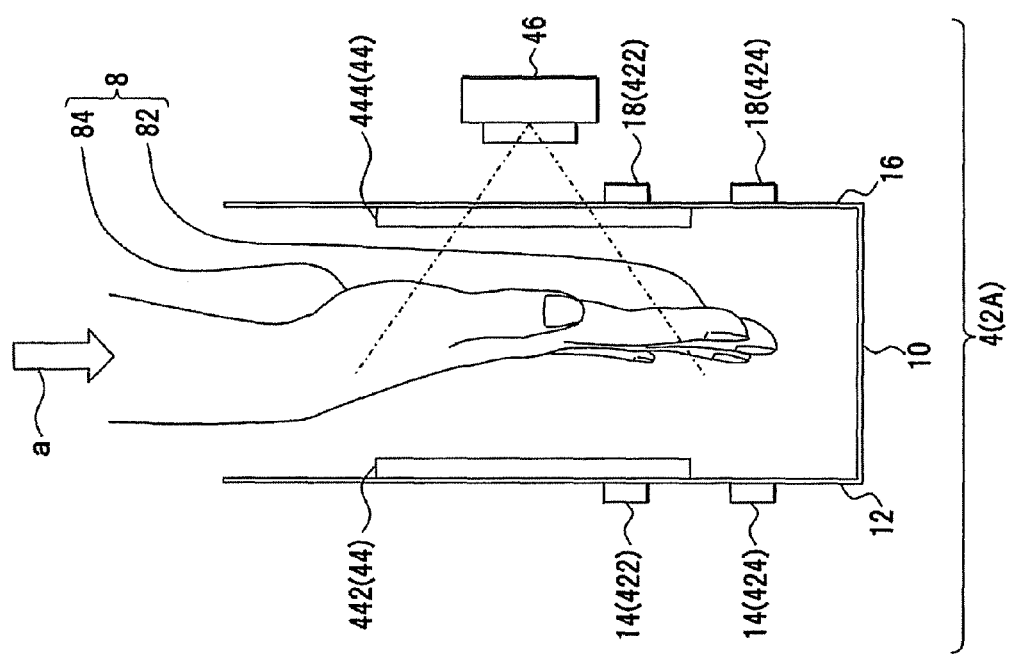

FIG. 6

| IMAGING POSITION | BIOMETRIC INFORMATION | ILLUMINATION METHOD | IMAGING METHOD |
|---|---|---|---|
| FINGER | FINGERPRINT | NEAR-INFRARED ILLUMINATION | TRANSPARENT IMAGING |
| | | ULTRAVIOLET/ VISIBLE LIGHT ILLUMINATION | REFLECTION IMAGING |
| | VEIN | NEAR-INFRARED ILLUMINATION | TRANSPARENT IMAGING |
| PALM | VEIN | NEAR-INFRARED ILLUMINATION | REFLECTION IMAGING |
| | HAND OUTLINE | ULTRAVIOLET TO NEAR-INFRARED ILLUMINATION | SILHOUETTE IMAGING |
| | PALM PRINT | ULTRAVIOLET ILLUMINATION | REFLECTION IMAGING |
| BACK OF HAND | VEIN | NEAR-INFRARED ILLUMINATION | REFLECTION ILLUMINATION |
| WRIST | VEIN | NEAR-INFRARED ILLUMINATION | REFLECTION ILLUMINATION |

AUTHENTICATION APPARATUS

CROSS-REFERENCE TO RELATED APPLICATION

This application is based upon and claims the benefit of priority of the prior Japanese Patent Application No. 2008-258951, filed on Oct. 3, 2008, the entire contents of which are incorporated herein by reference.

FIELD

A certain aspect of the embodiments discussed herein is related to an authentication apparatus.

BACKGROUND

Biometric authentication is a technique which provides user identity verification using biometric features such as fingerprints, the face, the iris, voiceprints, handwriting, etc. As compared with user identity verification based upon the user's memory such as a secret identification code, password, etc., in principle, it is difficult to crack biometric authentication by spoofing (i.e., an unauthorized user using a false identity). Accordingly, there has been more interest in biometric authentication as a technique which provides high security.

The multi-biometric technique is a technique which uses a combination of multiple biometric authentication items such as fingerprint authentication and face authentication, etc. By adjusting the combination, the ease of use may be improved or the security level may be raised. With an arrangement in which the user identity is verified if at least one of multiple authentication items is successful, authentication may be performed using a different authentication item even if fingerprint authentication may not be performed due to a situation in which the user's finger has been injured, etc., thereby improving the ease of use. An arrangement in which the user identity is verified only if all the multiple authentication items are successful provides an extremely high security level. Thus, such an arrangement may be applied to an access control operation for highly classified information, and so forth.

The user's hand is highly suitable for acquiring biometric information. Various authentication methods such as fingerprint authentication, vein authentication, hand outline authentication, etc., have already been implemented. Using a combination of such authentication methods, multi-biometric authentication is easily realized, which has the potential to improve authentication convenience or improve authentication precision.

Japanese Laid-open Patent Publication No. 2006-65400, Japanese Laid-open Patent Publication No. 2006-285487, Japanese Laid-open Patent Publication No. 2004-139611, Japanese Laid-open Patent Publication No. 2003-75892, Japanese Laid-open Patent Publication No. 2002-71578 and Japanese Laid-open Patent Publication No. 2006-153633 have been proposed.

SUMMARY

According to an aspect of an embodiment, an apparatus for authenticating a user includes a detector for determining a state or a position of a bodily part placed by the user for biometric authentication, a unit capable of obtaining biometric data from different portion of the bodily part, a plurality of biometric authentication engines capable of authenticating the user by using one of a plurality of authentication algorithms by comparing the biometric data with reference data, respectively, and a controller for selecting one of the different portions of the bodily part so as to select associated biometric data, and determining one of the biometric authentication engines for authenticating the user on the basis of the state or the position of the bodily part placed.

The objects and advantages of the invention will be realized and attained by the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a flowchart which illustrates a processing procedure for authentication;

FIGS. 3A and 3B are diagrams which illustrate an example of an imaging apparatus;

FIG. 5 is a diagram which illustrates a modification of the imaging apparatus;

FIG. 6 is a diagram which illustrates biometric information, illumination, and an imaging method that corresponds to the imaging position;

DESCRIPTION OF EMBODIMENTS

Preferred embodiments of the present invention will be described with reference to the accompanying drawings.

First Embodiment

Figure 1:
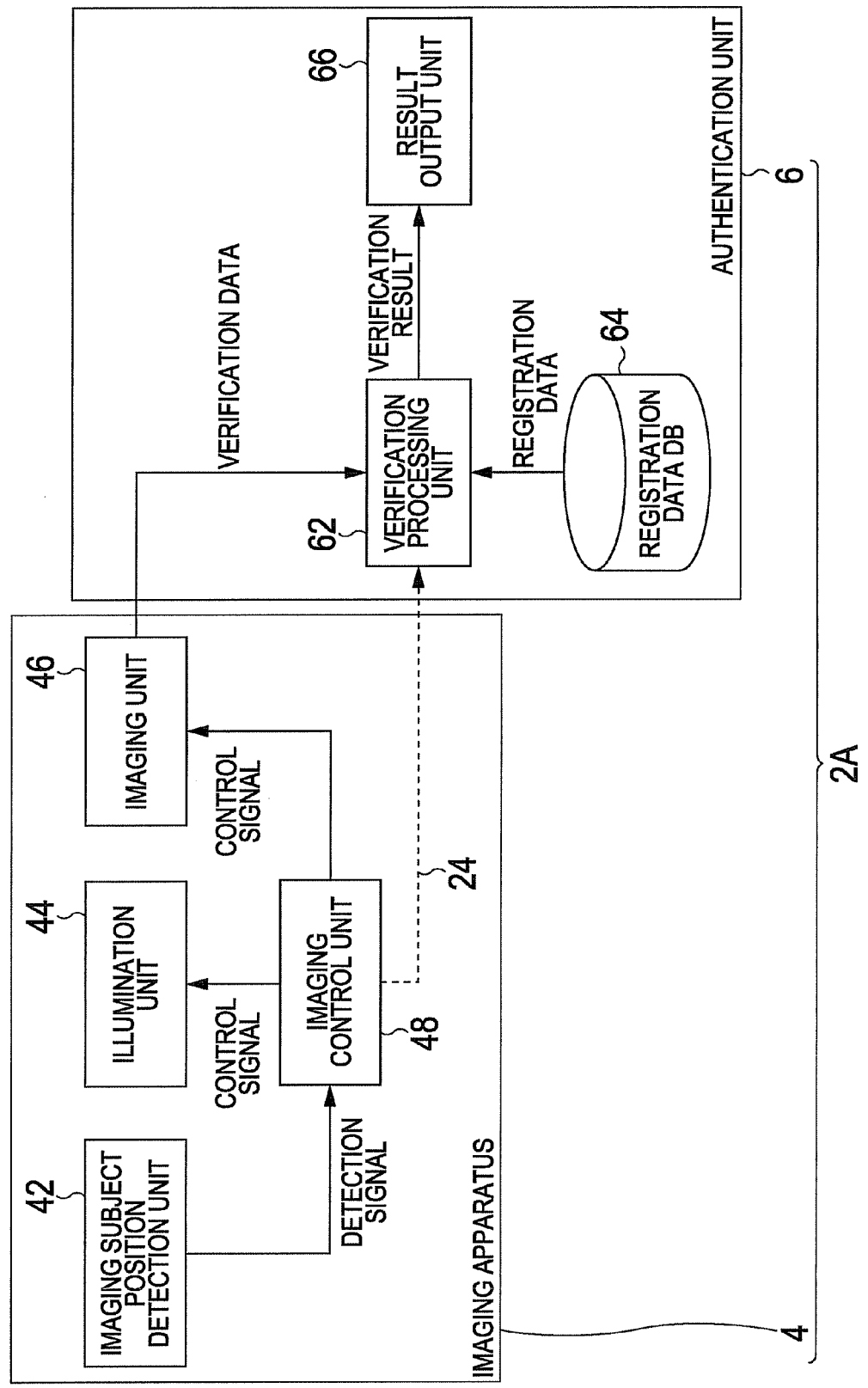
FIG. 1 is a diagram which illustrates a biometric authentication apparatus according to a first embodiment.

Description will be made regarding a first embodiment with reference to FIG. 1 and FIG. 2. FIG. 1 is a diagram which illustrates a biometric authentication apparatus according to the first embodiment. FIG. 2 is a flowchart which illustrates a processing procedure for authentication. The configurations illustrated in FIG. 1 and FIG. 2 will be described for exemplary purpose only. The present invention is not restricted to such configurations.

A biometric authentication apparatus 2A is an example of an imaging apparatus according to the present invention or an authentication apparatus employing the imaging apparatus. With such an arrangement, the imaging position is determined based upon the position of the user's hand, which is an example of the imaging target body, the optimum imaging method is selected according to the position thus determined, and the imaging is performed using the imaging method thus selected.

As illustrated in FIG. 1, the biometric authentication apparatus 2A includes an imaging apparatus 4 and an authentication unit 6. The imaging apparatus 4 selects an imaging method according to the position of the user's hand, which is an imaging subject, and which acquires an image using the imaging method thus selected. The authentication unit 6 performs authentication using the biometric image thus acquired. For example, the authentication unit 6 verifies the biometric image acquired in the imaging operation against a registered image, and outputs an authentication output, which is an authentication result.

The imaging apparatus 4 includes an imaging subject position detection unit 42, an illumination unit 44, an imaging unit 46, and an imaging control unit 48. The imaging subject position detection unit 42 detects the position of the imaging subject. The imaging subject position detection unit 42 detects the position of the user's hand, which is an example of the imaging subject. The imaging subject position detection unit 42 includes a first insertion detection unit 422 (first detector) and a second insertion detection unit 424 (second detector) which is arranged at a position that differs from that of the first insertion detection unit 422 (FIGS. 3A and 3B). The detection results thus detected at these positions are transmitted to the imaging control unit 48, and are used as reference data based upon which imaging method is selected. A detector determines a state or position of a bodily part placed by a user for biometric authentication. The imaging unit 46 is a unit capable of obtaining biometric data from different portion of the bodily part.

The illumination unit 44 is an illumination device which emits light, necessary for the imaging, to the imaging subject. The illumination unit 44 performs an illumination operation according to the imaging method selected by the imaging control unit 48.

The imaging unit 46 acquires an image of the imaging subject. The imaging unit 46 acquires an image of a position on/in the imaging subject using the optimum imaging method selected by the imaging control unit 48. The imaging unit 46 may be configured as a CCD (Charge Coupled Device) camera, for example.

The imaging control unit 48 controls the illumination unit 44 and the imaging unit 46. Upon receiving a detection signal which indicates the position of the imaging subject from the imaging subject position detection unit 42, the imaging control unit 48 determines the imaging position based upon the position thus detected, and selects the optimum illumination and/or the optimum imaging method.

Furthermore, the authentication unit 6 includes a verification processing unit 62, a registration data database (DB) 64, and a result output unit 66. The verification processing unit 62 verifies the biometric image acquired by the imaging unit 46, i.e., the verification data, against the registration data registered in the registration data DB 64. The verification processing unit 62 outputs a verification result which indicates a match/mismatch judgment or a similarity level. The verification processing unit 62 has a plurality of biometric authentication engines capable of authenticating the user by using one of a plurality of authentication algorithms by comparing the biometric data with reference data, respectively. The imaging control unit 48 is a controller for selecting one of the different portions of the bodily part so as to select associated biometric data, and determining one of the biometric authentication engines for authenticating the user on the basis of the state or position of the bodily part placed.

The registration data DB 64 stores biometric information, which is used to verify the verification data, as registration data. The verification result obtained by the verification processing unit 62 is outputted via the result output unit 66 as the authentication output.

The processing procedure (FIG. 2) for the authentication processing performed by the biometric authentication apparatus 2A having such a configuration includes imaging processing and authentication processing. The processing procedure is an example of an imaging method or an imaging program. As illustrated in FIG. 2, in the processing procedure, the imaging subject position detection unit 42 detects the position of the imaging subject, and transmits the result thus detected to the imaging control unit 48 (Step S1). The imaging control unit 48 acquires the position information, determines the position based upon the detection position, selects the optimum imaging method, and transmits a control signal, which is an instruction to provide the imaging method thus selected, to the illumination unit 44 and the imaging unit 46 (Step S2). The image acquired using the imaging method thus selected is transmitted to the verification processing unit 62 as the verification data (Step S3). The verification processing unit 62 reads out the registration data from the registration data DB 64 in which the registration data was registered beforehand, makes a comparison between the verification data and the registration data, and outputs the verification result to the result output unit 66 (Step S4). Then, the imaging processing and the authentication processing end.

Figure 4:
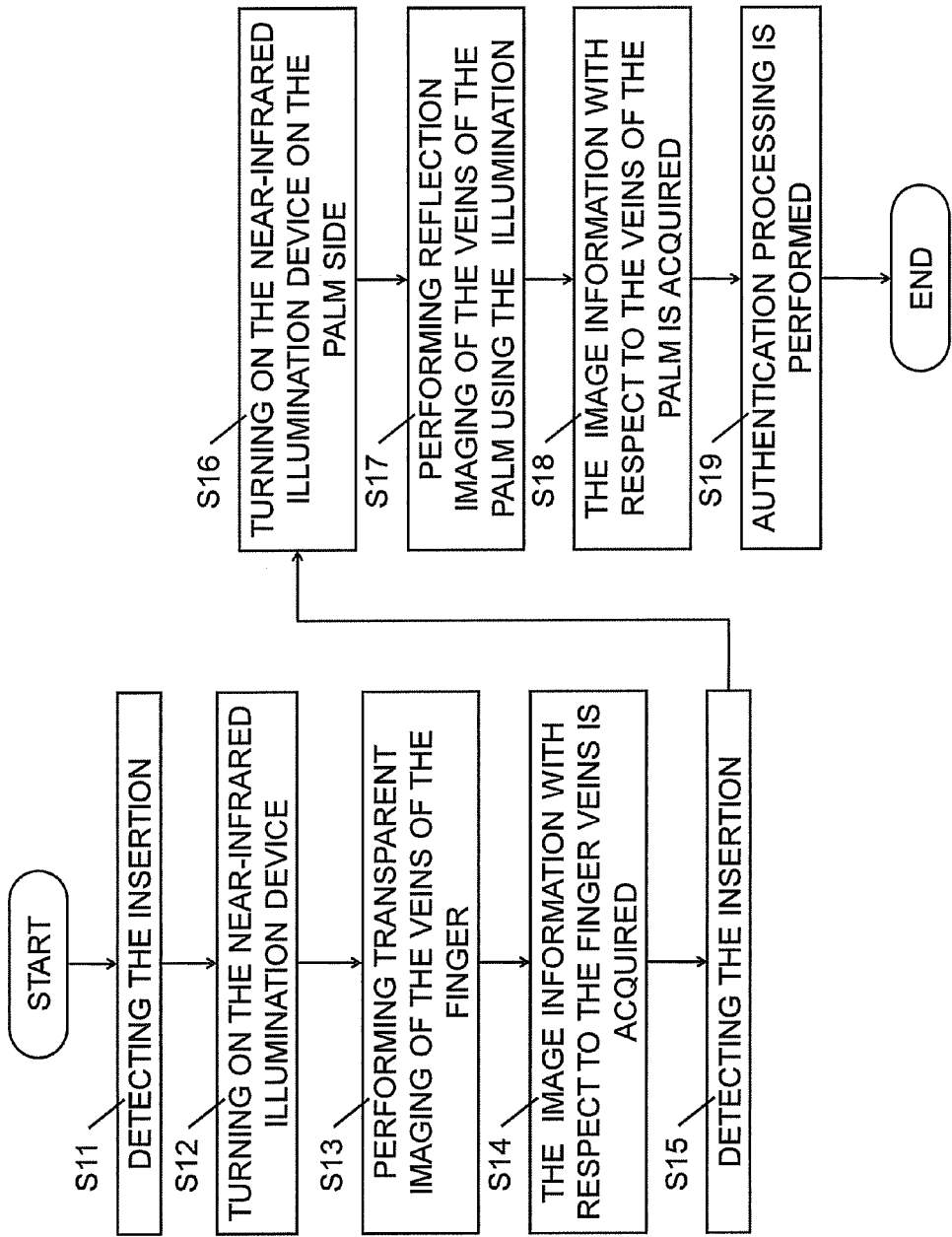
FIG. 4 is a flowchart which illustrates a processing procedure for imaging processing and authentication processing.

Next, description will be made regarding the imaging apparatus 4 with reference to FIGS. 3A, 3B and FIG. 4. FIGS. 3A and 3B are diagrams illustrating an example configuration of the imaging apparatus. FIG. 4 is a flowchart which illustrates the processing procedure for the imaging processing and the authentication processing. The configurations illustrated in FIGS. 3A, 3B and FIG. 4 are described for exemplary purpose only, and the present invention is not restricted to such configurations. The same components illustrated in FIGS. 3A and 3B as those in FIG. 1 are denoted by the same reference numerals.

The imaging apparatus 4 has a configuration which provides two different imaging methods, i.e., a transparent imaging (image acquisition) method and a reflection imaging (image acquisition) method. As illustrated in FIG. 3A and FIG. 3B, the imaging apparatus 4 includes a casing 10 which allows the user to insert his/her hand 8 as the imaging subject. The casing 10 includes a first insertion detection unit 422 and a second insertion detection unit 424 each of which detects the position of the user's hand 8 thus inserted, i.e., a user's finger 82, and which are arranged along the insertion direction in which the user's hand is to be inserted. Each of the insertion detection units 422 and 424 is configured as a photo interrupter. A light emitting unit 14 is arranged at a ceiling portion 12 of the casing 10, and a light receiving unit 18 is arranged at a base portion 16 thereof. With such an arrangement, the light L which is to reach the light receiving unit 18 from the light emitting unit 14 is interrupted by the user's finger 82 or the palm 84 of the user's hand, thereby allowing the position of the user's hand 8 to be detected based upon the output from the light receiving unit 18.

As illustrated in FIG. 3A, a near-infrared illumination device 442 included in the illumination unit 44 is arranged at the ceiling portion 12 of the casing 10. The imaging unit 46 is arranged below the base portion 16 of the casing 10. The imaging unit 46 acquires an image by receiving the light that passes through the user's hand 8 using the illumination 20 provided by the near-infrared illumination device 442. In this case, a transparent imaging method is used as the imaging method.

Furthermore, as illustrated in FIG. 3B, a near-infrared illumination device 444 included in the illumination unit 44 is arranged at the base portion 16 of the casing 10. With such an arrangement, using the illumination 22 provided by the near-infrared illumination device 444 arranged at the base portion 16 of the casing 10, the imaging unit 46 receives the reflected light from the user's hand 8, and acquires an image thereof. In this case, a reflection imaging method is used as the imaging method.

Such an arrangement allows multiple biometric information (transparent image and reflection image) to be easily acquired with respect to multiple different positions on/in a single subject using a single imaging apparatus 4.

The processing procedure for the imaging processing and the authentication processing performed by the biometric authentication apparatus 2 is an example of an imaging method, an authentication method, an imaging program, or an authentication program. With such an arrangement, when the subject inserts his/her hand 8 into the casing 10, multiple images of different positions on/in the subject are acquired, thereby enabling authentication to be performed based upon the multiple biometric images.

In the processing procedure, when the finger 82 reaches the position (first stage) where the finger 82 interrupts the light L1 after the subject inserts his/her hand 8 partway into the casing 10 as illustrated in FIG. 4, the insertion detection unit 422 detects the insertion (Step S11), detects that the finger 82 has entered the imaging range (field of view) of the imaging unit 46, and transmits a corresponding detection signal to the imaging control unit 48.

Upon receiving the detection signal, the imaging control unit 48 turns on the near-infrared illumination device 442 arranged on the back of the hand 8 side (Step S12) so as to generate the illumination 20, thereby providing back illumination of the hand 8. Furthermore, the imaging control unit 48 performs transparent imaging of the veins of the finger (or fingerprints) (Step S13). Thus, the image information with respect to the finger veins (or fingerprints) is acquired (Step S14).

When the finger reaches the position where the finger 82 interrupts the light L2 after the subject further inserts his/her hand 8 (second stage) as illustrated in FIG. 3B, the insertion detection unit 424 detects the insertion (Step S15), detects that the palm 84 has entered the imaging range (field of view) of the imaging unit 46, and transmits a corresponding detection signal to the imaging control unit 48 as a notice. The imaging control unit 48 turns on the near-infrared illumination device 444 on the palm 84 side (Step S16), and performs reflection imaging of the veins of the palm using the illumination 22 (Step S17). Thus, image information with respect to the veins of the palm is acquired (Step S18). Authentication processing is performed based upon the images thus acquired (Step S19).

Immediately after the imaging processing, the images thus acquired in the first stage and the second stage are outputted to the verification processing unit 62, and verification is performed. Also, an arrangement may be made in which judgment is made whether the verification image has been acquired for the finger or the palm (such a notice may be transmitted by storing the position information in a data header according to the biometric data format stipulated by ISO/IEC19794-9 or the like), and a notice is transmitted from the imaging control unit 48 to the verification processing unit 62 via a signal line (broken line 24 in FIG. 1).

Description has been made regarding an arrangement in which the position detection is performed using the insertion detection units 422 and 424. Also, an arrangement may be made in which the imaging unit 46 provides functions as the insertion detection units 422 and 424, i.e., a moving image is acquired by the imaging unit 46, which is an imaging camera, for example, and the position in the image thus acquired in the field of view is determined.

Description has been made with reference to FIG. 3A and FIG. 3B regarding an arrangement in which the casing 10 is arranged horizontally. Also, as illustrated in FIG. 5, an arrangement may be made in which the casing 10 is arranged such that it stands vertically, thereby allowing the user to insert his/her hand along the vertical direction indicated by the arrow a. The same components illustrated in FIG. 5 as those in FIG. 3A and FIG. 3B are denoted by the same reference numerals, and description thereof will be omitted.

Features, advantages, and modifications drawn from the above-described embodiment will be listed below.

The imaging apparatus 4 is an apparatus which performs imaging processing so as to obtain biometric information, and includes the imaging unit 46 which performs imaging processing so as to obtain biometric information, and the illumination unit 44. The imaging apparatus 4 has a detection function for detecting the relative position of the imaging subject with respect to the imaging unit 46, and is capable of selecting the imaging method according to the relative position of the imaging subject thus detected.

The biometric authentication apparatus 2A includes the imaging apparatus 4 which performs imaging processing so as to obtain biometric information. The imaging apparatus 4 includes the imaging unit 46 which performs imaging processing so as to obtain biometric information, and the illumination unit 44. The imaging apparatus 4 has a detection function for detecting the relative position of the subject with respect to the imaging unit 46, and a function for selecting the imaging method according to the relative position of the imaging subject. The imaging apparatus 4 further includes the authentication unit 6 which performs authentication based upon the image acquired using the imaging method (imaging mode) thus selected, thereby allowing the authentication to be performed according to the imaging method thus selected based upon the position of the imaging subject.

The imaging apparatus 4 or the biometric authentication apparatus 2A is an apparatus which acquires biometric information with respect to the hand 8. When the subject inserts his/her hand 8 into the casing 10, the insertion stage is detected so as to switch the imaging method, and biometric information is acquired. Thus, such an arrangement is capable of acquiring the most suitable biometric information according to the position thus detected, thereby providing authentication using such a biometric image thus acquired.

The imaging apparatus 4 or the biometric authentication apparatus 2A is an apparatus which acquires images so as to obtain biometric information with respect to the hand 8, and which has a function for detecting the position relation between the illumination and the imaging subject, thereby obtaining biometric information based upon the image according to the position. Such an arrangement provides high-precision authentication.

As described above, such a simple arrangement is capable of acquiring images so as to obtain multiple kinds of biometric information using an optimum method. Thus, such an arrangement provides high-precision authentication and improves the degree of freedom of the authentication.

The optimum imaging method is selected according to the position of the target body, and an image of the target body may be acquired using the imaging method thus selected.

In a case in which the position of the target body may change, the optimum imaging method is selected according to the position so as to acquire an image of the target body. Thus, multiple images may be acquired with respect to a single target body at different positions.

Authentication may be performed based upon biometric images acquired using imaging methods which are selected according to the position of the biometric target, thereby improving the authentication precision.

Second Embodiment

Next, description will be made regarding a second embodiment with reference to FIG. 6. FIG. 6 is a diagram which illustrates an example of a selection operation in the imaging method. The arrangement illustrated in FIG. 6 will be described for exemplary purpose only, and the present invention is not restricted to such an arrangement.

Description has been made in the first embodiment regarding an arrangement in which an image of the veins of the finger (or fingerprints) is acquired in the first stage, and an image of the veins of the palm is acquired in the second stage. However, the biometric information with respect to the hand is not restricted to such information. Rather, various kinds of information may be used, and an optimum imaging method may be selected. Various combinations of the imaging position, biometric information, illumination method, and imaging method may be used as illustrated in FIG. 6. A combination may be selected from among these combinations as desired.

Referring to FIG. 6, in a case in which the imaging position is the finger, fingerprint data or vein data may be acquired as biometric information. In a case in which fingerprint data is used, a near-infrared illumination method is selected so as to provide illumination. In this case, the transparent imaging method is used as the imaging method. Alternatively, an ultraviolet illumination method or a visible light illumination method is selected so as to generate the illumination. In this case, reflection imaging is selected as the imaging method. As described above, in a case in which finger vein information is obtained as biometric information, the transparent imaging method using infrared illumination is selected.

In a case in which the palm of the hand is the imaging position, palm vein data, hand outline data, or palm print data is obtained. In this case, an infrared illumination method or an ultraviolet illumination method is selected so as to provide the illumination. Furthermore, a reflection imaging method or a silhouette, imaging method is selected as the imaging method. Moreover, the back of the hand and the wrist may be used as the imaging position. In both cases, vein information is acquired as biometric information. In this case, the infrared illumination method is employed so as to generate the illumination, and the reflection imaging method is selected as the imaging method.

As described above, there is a need to appropriately select or switch the illumination method or the imaging method according to the biometric image to be used for the authentication method. With the biometric authentication apparatus 2A, various kinds of biometric information may be acquired with respect to multiple different positions based upon the multiple detected positions. In the drawings, silhouette imaging may be performed using the imaging mode for transparent imaging illustrated in FIG. 3A.

Third Embodiment

Next, description will be made regarding a third embodiment with reference to FIGS. 7A and 7B and FIGS. 8A and 8B. FIGS. 7A and 7B and FIGS. 8A and 8B are diagrams which illustrate an imaging apparatus according to the third embodiment. The configuration illustrated in FIGS. 7A and 7B and FIGS. 8A and 8B will be described for exemplary purpose only, and the present invention is not restricted to such a configuration. The same components illustrated in FIGS. 7A and 7B and FIGS. 8A and 8B as those in FIG. 1 and FIGS. 3A and 3B are denoted by the same reference numerals.

Figure 7A:
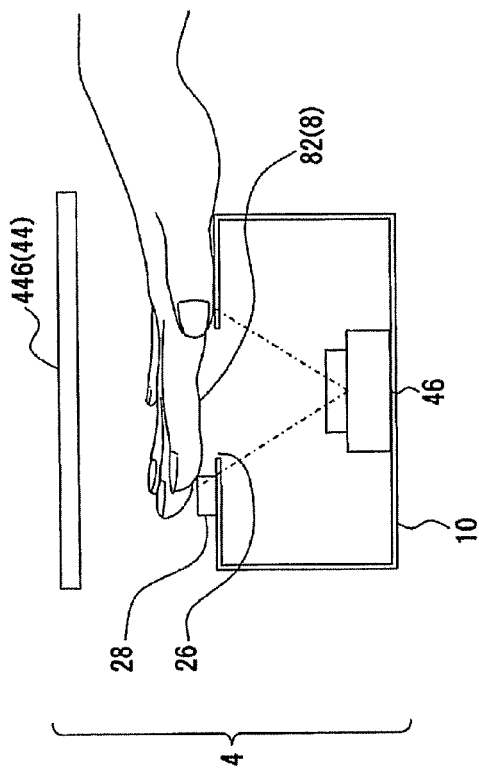
FIGS. 7A and 7B are diagrams which illustrate an imaging apparatus according to a third embodiment.
Figure 7B:
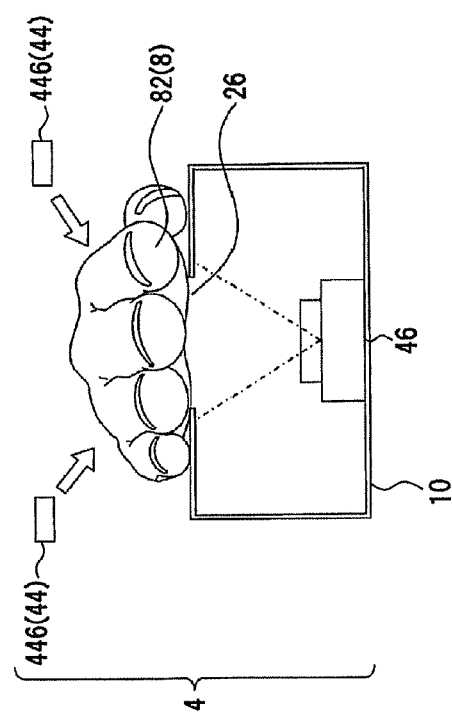

As illustrated in FIG. 7A and FIG. 7B, the imaging apparatus 4 has a configuration in which the imaging unit 46 is arranged within the casing 10, which allows an image of the user's hand 8 which is an imaging subject to be acquired via a window portion 26 formed on the ceiling portion 12 side of the casing 10. A contact detection device 28, which detects whether the finger 82 is in contact therewith, is arranged at the edge of the window portion 26 of the casing 10. The contact detection device 28 detects whether or not the finger 82 is in contact, and inputs a corresponding detection signal to the imaging control unit 48 so as to select the imaging method.

As illustrated in FIG. 7A and FIG. 7B, when the finger 82 is in contact with the contact detection device 28, a transparent imaging method is selected. In this case, a near-infrared illumination device 446 arranged obliquely above the hand 8 is turned on, thereby allowing the imaging unit 46 to acquire a transparent image of the finger 82.

Figure 8A:
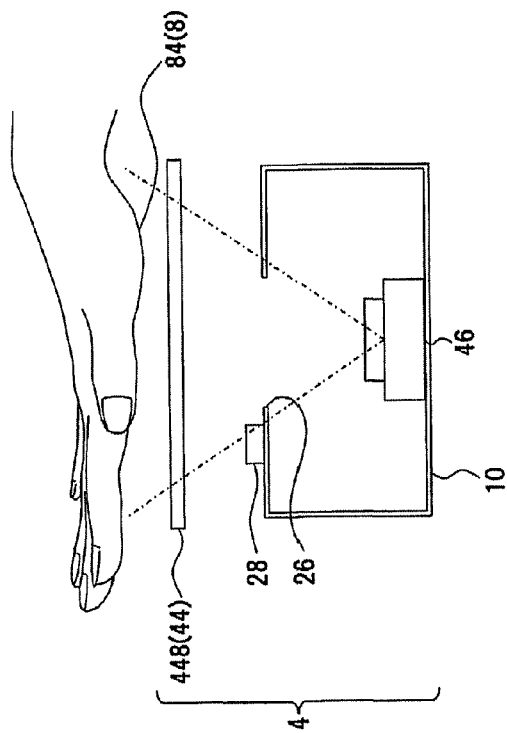
FIGS. 8A and 8B are diagrams which illustrate an example of the imaging apparatus.
Figure 8B:
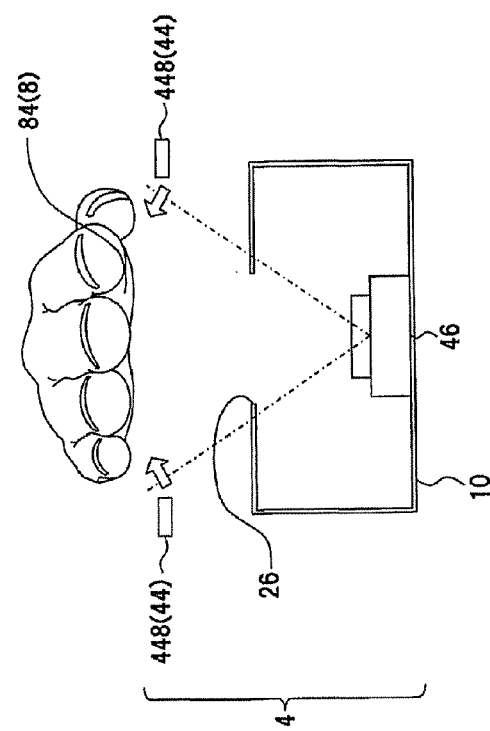

Furthermore, as illustrated in FIG. 8A and FIG. 8B, when there is a distance between the finger 8 and the contact detection device 28, i.e., when the finger 8 is not in contact with the contact detection device 28, the reflection imaging method is selected. In this case, a near-infrared illumination device 448 arranged obliquely below the hand 8 is turned on, thereby allowing the imaging unit 46 to acquire a reflection image of the palm 48. With such an arrangement, a single device may serve as the near-infrared illumination devices 446 and 448.

With such an arrangement, the detection of the position of the imaging subject may be performed using a detector such as a distance sensor or the like, instead of the contact detection device.

Description has been made in the first embodiment regarding an arrangement in which the insertion detection units 442 and 424 are arranged as the imaging subject position detection unit 42 which detects the position of the finger 82. Also, an arrangement may be made in which a distance sensor is arranged so as to detect the distance to the imaging subject. Also, an arrangement may be made in which a contact sensor is arranged so as to detect whether or not the imaging subject is in contact. Also, such an arrangement may allow the subject to select the imaging method or the biometric information to be supplied, based upon the information of whether or not the imaging subject is in contact. Also, an arrangement may be made in which the biometric information is selected according to the authentication method. In a case in which an image acquired by an imaging camera which is an imaging means or a proximity detection function provided by a distance sensor or the like is used, an arrangement may be made in which, when the imaging subject enters the field of view, an illumination is turned on so as to acquire the biometric information.

Fourth Embodiment

Figure 9:
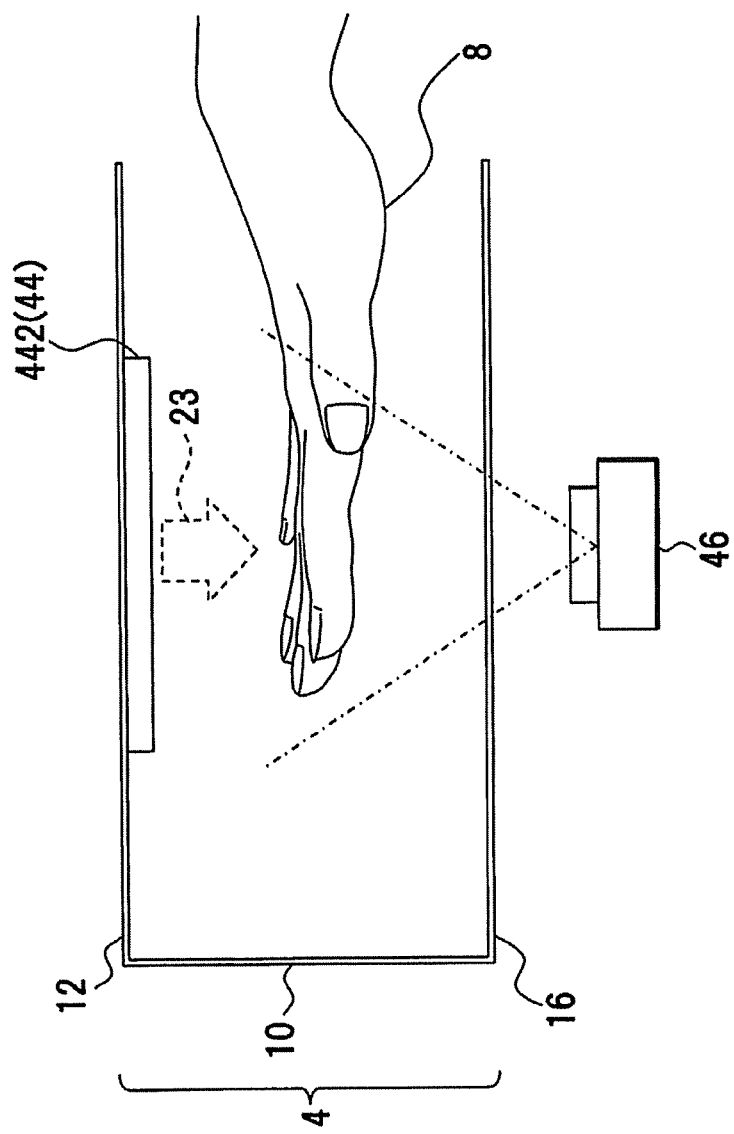
FIG. 9 is a diagram which illustrates an imaging apparatus according to a fourth embodiment.
Figure 10:
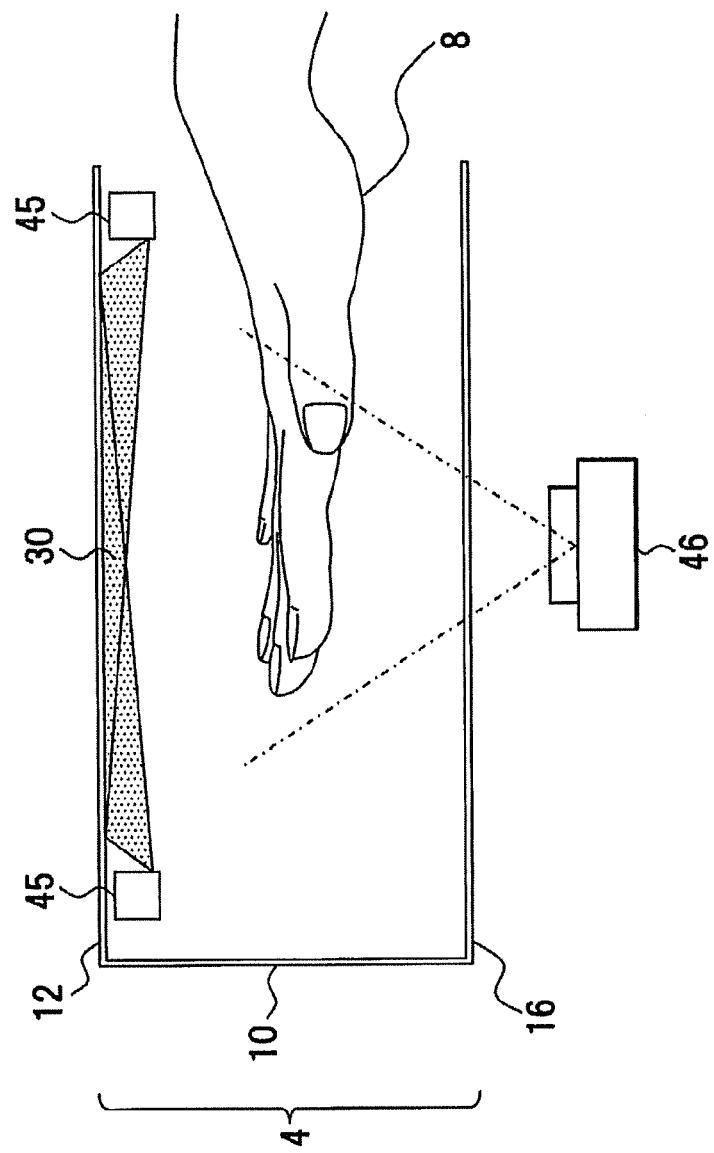
FIG. 10 is a diagram which illustrates another imaging apparatus.
Figure 11:
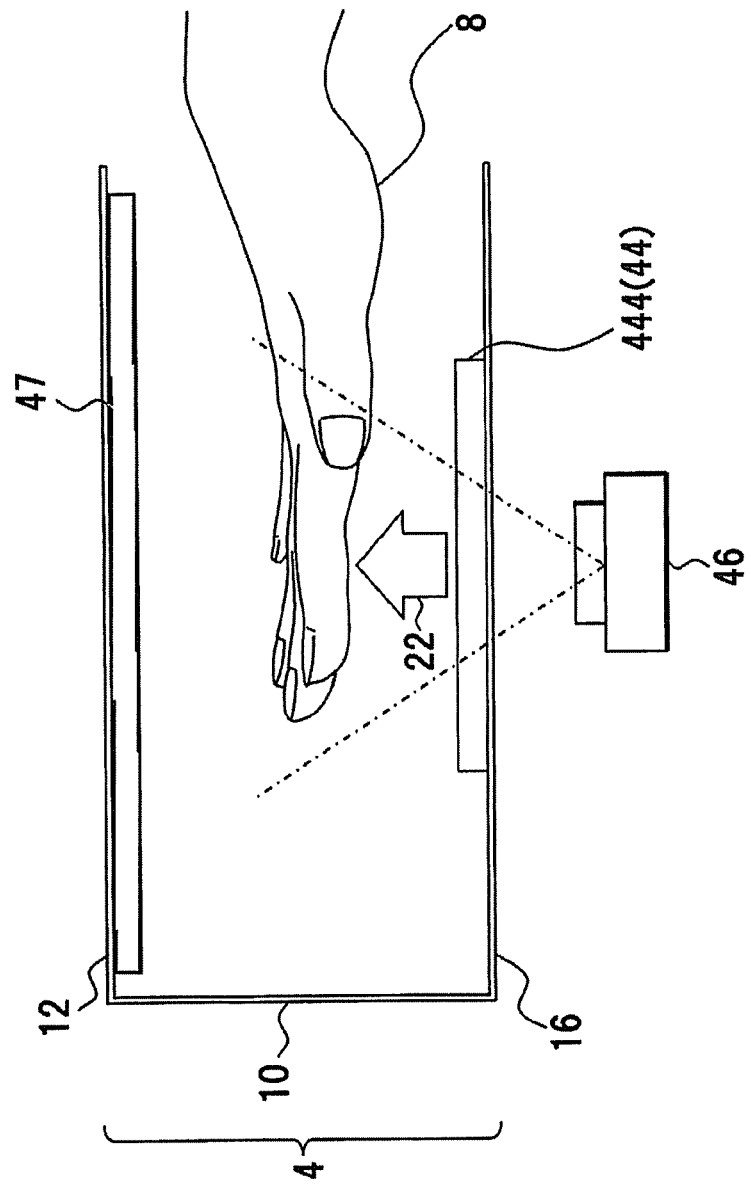
FIG. 11 is a diagram which illustrates yet another imaging apparatus.

Next, description will be made regarding a fourth embodiment with reference to FIG. 9, FIG. 10, and FIG. 11. FIG. 9, FIG. 10, and FIG. 11 are diagrams which illustrate an imaging apparatus according to the fourth embodiment. The configuration illustrated in FIG. 9, FIG. 10, and FIG. 11 will be described for exemplary purpose only, and the present invention is not restricted to such a configuration.

In a case in which a silhouette image is acquired using the imaging apparatus 4, the configuration described in the first embodiment (FIG. 3A) may be employed. With such an arrangement, as illustrated in FIG. 9, the near-infrared illumination device 442 may have a function for providing illumination with a low magnitude.

In this case, the illumination 23 is provided as a background illumination with a low magnitude, instead of emitting light to the finger 82 which is an imaging subject facing the imaging unit 46. With such an arrangement which has a function for providing a background illumination with a reduced magnitude, the outline data is protected from being degraded due to saturation of the imaging element included in the imaging unit 46. The same components illustrated in FIG. 9 as those in FIG. 3A are denoted by the same reference numerals, and description thereof will be omitted.

Also, an arrangement may be made in which the aperture or the exposure condition of the imaging unit 46 is adjusted, instead of employing a method for providing the illumination with a reduced magnitude. It may be noted that a plane illumination device, which emits light with a uniform magnitude from the background surface, is most preferably employed. However, in a case in which the difference in the luminance between the imaging subject surface and the background is sufficiently great, a silhouette image may be obtained by performing image binarization processing. Such an arrangement may be applied regardless of whether or not the illumination device is a plane illumination device.

As another arrangement, as illustrated in FIG. 10, an arrangement may be made in which a background illumination device 45 is arranged at the ceiling portion 12 of the casing 10, and a background illumination 30 is provided on the back side of the hand 8 which is an imaging subject. The same components illustrated in FIG. 10 as those in FIG. 3A are denoted by the same reference numerals, and description thereof will be omitted. With such an arrangement, the illumination is supplied to the background surface, whereby the background surface reflects light with a uniform luminance. In this case, an arrangement is most preferably made in which the illumination is supplied such that the background surface is illuminated with a uniform luminance. However, it is sufficient that there is a sufficiently great difference in the luminance between the background and the imaging subject Also, as yet another arrangement, as illustrated in FIG. 11, an arrangement may be made in which a black background plate 47 is arranged at the ceiling portion 12 of the casing 10 as a background means which absorbs the light, thereby providing the back side of the hand 8, which is an imaging subject, as the black side. The same components illustrated in FIG. 11 as those in FIG. 3B are denoted by the same reference numerals, and description thereof will be omitted.

With such an arrangement, the imaging subject is setted to the light (white) state, and the background is setted to the dark (black) state. The background is formed in a color which absorbs the illumination wavelength (generally, black is preferably employed), and the illumination 22 is supplied from the front side of the imaging subject (from the side facing the imaging unit 46). With such an arrangement, the contrast of the silhouette image of the hand 8 is improved; thereby providing a clear silhouette image.

Fifth Embodiment

Figure 12:
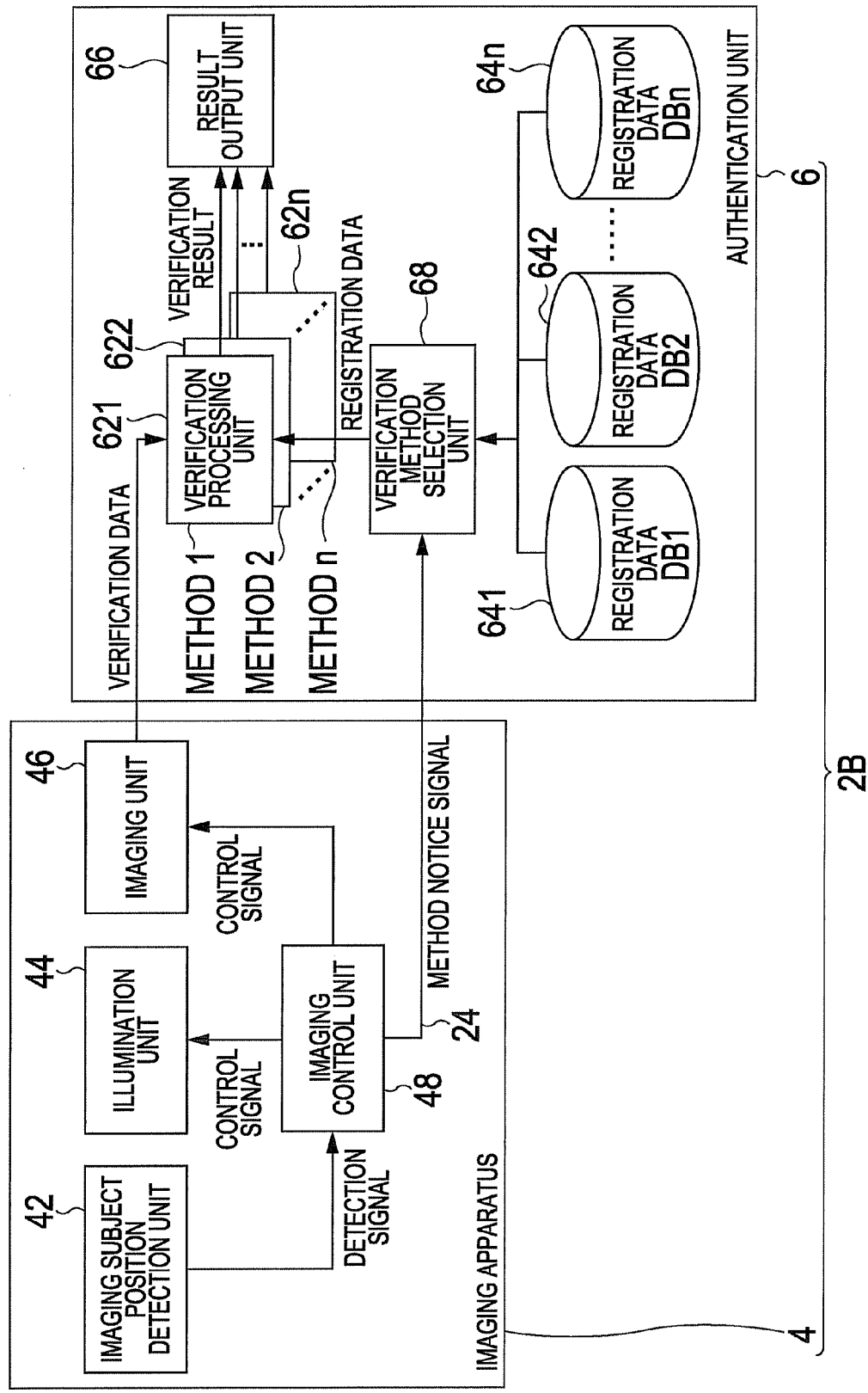
FIG. 12 is diagram which illustrates a biometric authentication apparatus according to a fifth embodiment.

Next, description will be made regarding a fifth embodiment with reference to FIG. 12. FIG. 12 is a diagram which illustrates a biometric authentication apparatus according to the fifth embodiment. The configuration illustrated in FIG. 12 will be described for exemplary purpose only, and the present invention is not restricted to such a configuration. The same components illustrated in FIG. 12 as those in FIG. 1 are denoted by the same reference numerals.

A biometric authentication apparatus 2B has a configuration in which the verification method used by the authentication unit 6 is selected according to the imaging method selected by the imaging unit 46. With such an arrangement, the authentication unit 6 includes: multiple verification units 621, 622, . . . , 62n, which correspond the respective imaging methods; a verification method selection unit 68 receives a method notice signal which is the imaging method notice information transmitted from the imaging control unit 48 and which selects the verification method; and registration data DBs 641, 642, . . . , 64n.

With such an arrangement, the verification method selection unit 68 selects one verification processing unit from among the verification processing units 621 through 62n according to the imaging method. Furthermore, the imaging unit 46 supplies the verification data to the verification processing unit selected from among the verification processing units 621 through 62n. Moreover, one registration data DB is selected from among the registration data DBs 641 through 64n according to the selection of the verification method selected by the verification method selection unit 68, thereby selecting the registration data as the authentication information that corresponds to the verification data. Verification is performed according to the imaging method, and the result output unit 66 outputs the verification results obtained by the verification processing units 621 through 62n.

With the embodiment, the authentication information and/or the authentication method, which are to be used to perform the authentication, are selected according to the imaging method selected based upon the position of the biometric target. This improves the degree of freedom of the selection of the authentication information, and improves the authentication precision.

Furthermore, the authentication information and/or the authentication method, which are used to perform the authentication, are selected according to the imaging method selected based upon the position of the biometric target. Thus, multiple biometric information obtained according to the respective positions may be used. Furthermore, the authentication information and/or the authentication method that correspond to the biometric information can be selected. Thus, multiple authentication can be performed at once. Furthermore, the authentication can be performed based upon the authentication information selected according to the selection of the position of the biometric target.

Sixth Embodiment

Figure 13:
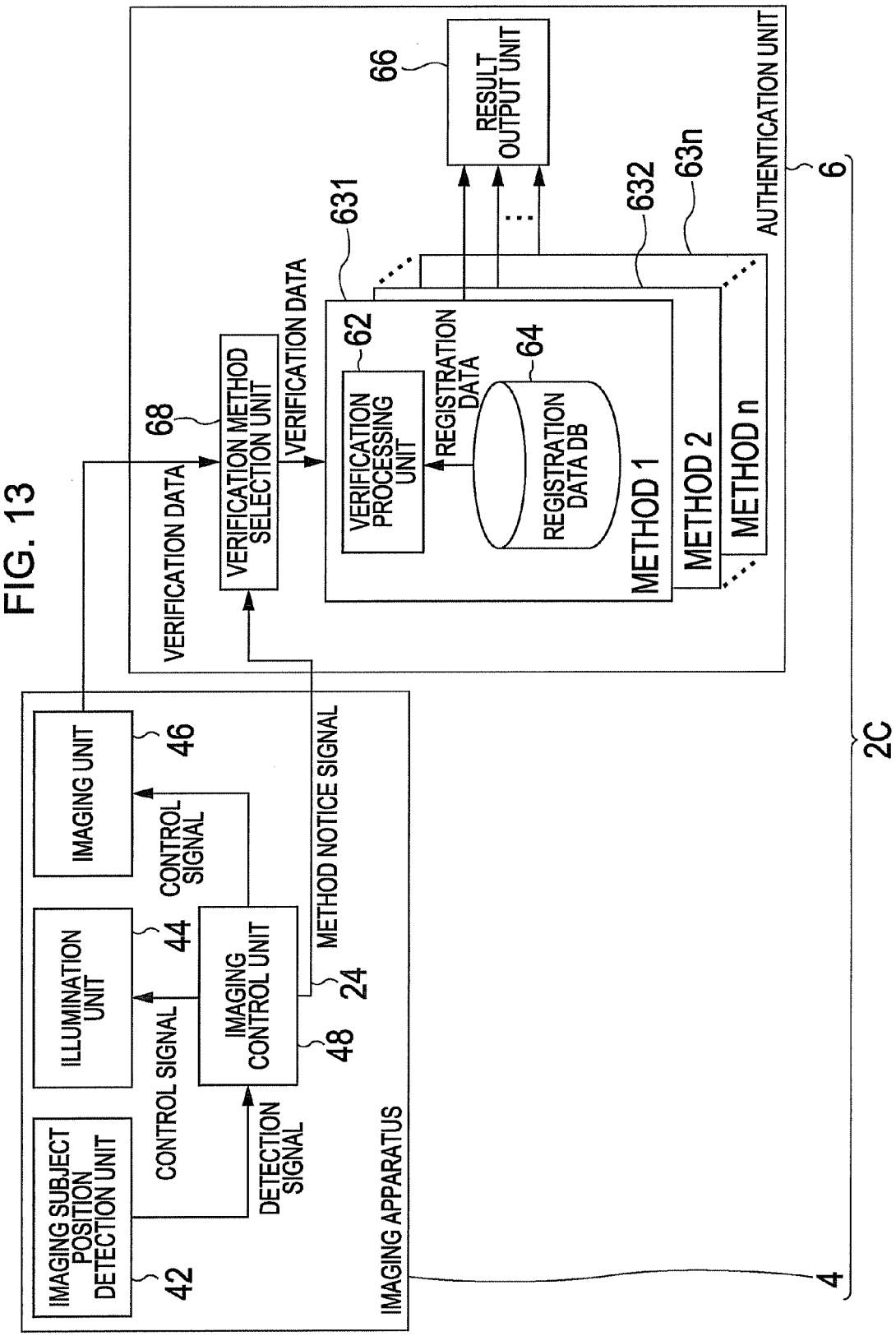
FIG. 13 is a diagram which illustrates a biometric authentication apparatus according to a sixth embodiment.

Next, description will be made regarding a sixth embodiment with reference to FIG. 13. FIG. 13 is a diagram which illustrates a biometric authentication apparatus according to a sixth embodiment. The configuration illustrated in FIG. 13 will be described for exemplary purpose only, and the present invention is not restricted to such a configuration. The same components illustrated in FIG. 13 as those in FIG. 1 or FIG. 12 are denoted by the same reference numerals.

A biometric authentication apparatus 2C has a configuration in which the authentication method used by the authentication unit 6 is selected according to the imaging method selected by the imaging unit 46, in the same way as in the fifth embodiment. With such an arrangement, the authentication unit 6 includes multiple verification units 631, 632, ..., 63n, which correspond to the respective verification methods which correspond to the imaging methods. Each of the verification units 631, 632, ..., 63n, includes a corresponding verification processing unit 62 and a registration data DB 64.

As a means which selects one verification unit from among the verification units 631, 632, ..., 63n, according to the imaging method selected by the imaging unit 46, the verification method selection unit 68 is arranged upstream to the verification units 631, 632, ..., 63n. Upon receiving a method notice signal which is imaging method notice information transmitted from the imaging unit 48, the verification method selection unit 68 selects one verification unit that corresponds to the verification method for the verification data that corresponds to the imaging method, from among the verification units 631, 632, ..., 63n.

With such an arrangement, the verification method selection unit 68 selects one verification unit from among the verification units 631, 632, ..., 63n, according to the imaging method. Furthermore, the imaging unit 46 supplies the verification data to the verification processing unit 62 included in the verification unit selected from among the verification units 631, 632, ..., 63n. The verification data thus supplied, is verified against the registration data registered in the registration DB 64 included in the verification unit selected from among the verification units 631, 632, ..., 63n. As a result, verification that corresponds to the imaging method is performed, and the result output unit 66 outputs the verification results obtained by the verification units 631, 632, ..., 63n.

With the present embodiment, the same advantages can be obtained as those obtained in the fifth embodiment.

Seventh Embodiment

Figure 14:
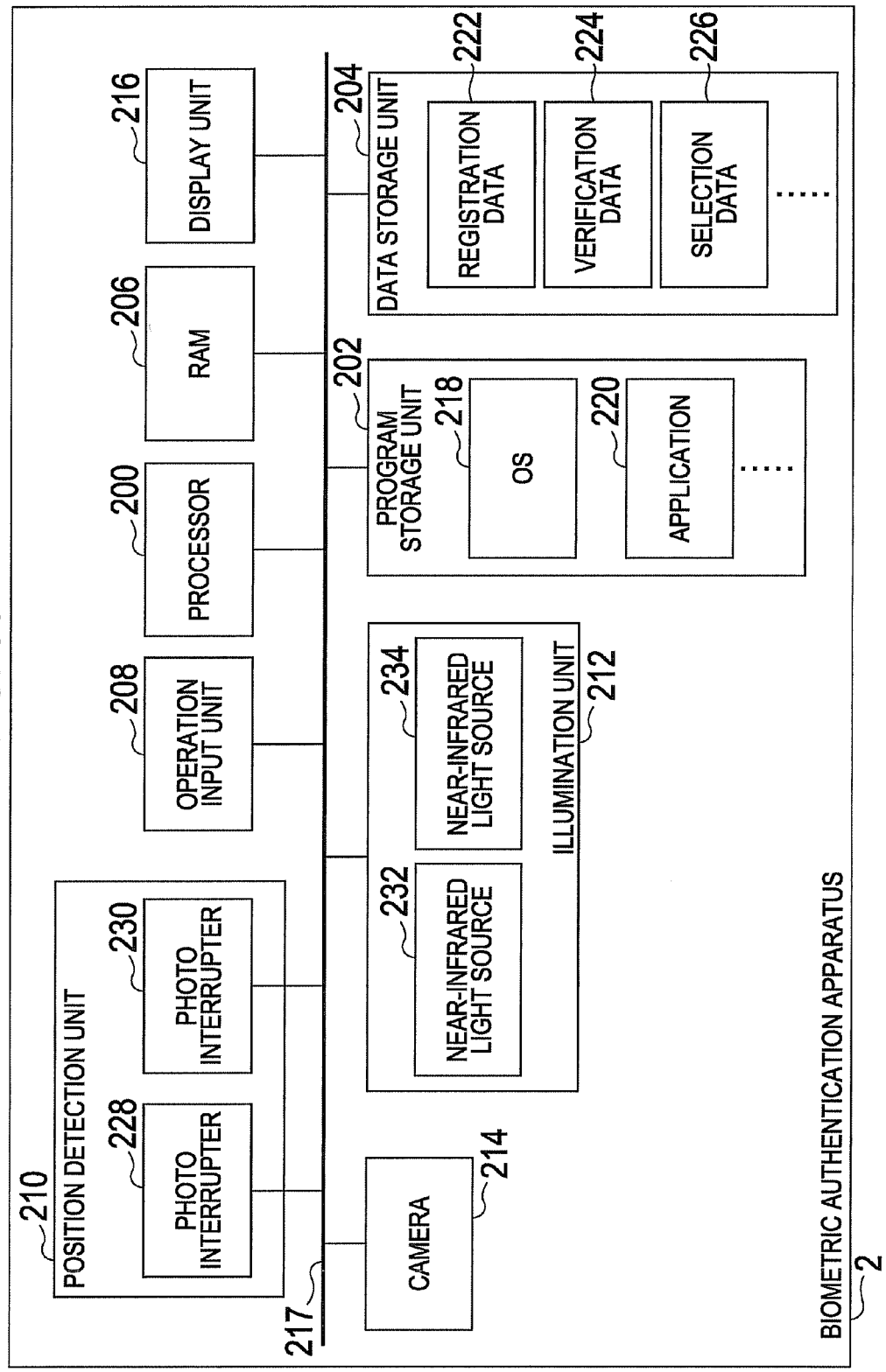
FIG. 14 is a diagram which illustrates a hardware configuration of a biometric authentication apparatus according to a seventh embodiment.

Next, description will be made regarding a seventh embodiment with reference to FIG. 14. FIG. 14 is a diagram which illustrates a hardware configuration of a biometric authentication apparatus according to the seventh embodiment. The configuration illustrated in FIG. 14 will be described for exemplary purpose only, and the present invention is not restricted to such a configuration. The same components in FIG. 14 as those in FIG. 1 are denoted by the same reference numerals.

A biometric authentication apparatus 2 is an example of the hardware configuration for providing the configuration of the above-described biometric authentication apparatuses 2A (FIG. 1) or 2B (FIG. 12), or the biometric authentication apparatus 2C (FIG. 13). The biometric authentication apparatus 2 has a configuration including a computer for providing the imaging apparatus 4 and/or the authentication unit 6. The biometric authentication apparatus 2 further includes a processor 200, a program storage unit 202, a data storage unit 204, RAM (Random-Access Memory) 206, an operation input unit 208, a position detection unit 210, an illumination unit 212, a camera 214, and a display unit 216, which are connected to each other via a bus 217.

The processor 200 executes an imaging control operation, an illumination control operation, verification processing, a display control operation, etc. For example, the processor 200 is configured as a CPU (Central Processing Unit), and performs an illumination operation, an imaging operation, acquisition of biometric information, verification against registration data, output of authentication results, etc., by executing an OS (Operating System) and application programs such as an imaging program, an authentication program, etc. The above-described imaging control unit 48 (FIG. 1), the verification processing unit 62 (FIG. 1), the result output unit 66 (FIG. 1, FIG. 12 or FIG. 13), the verification processing units 621, 622, ..., 62n (FIG. 12), the verification method selection unit 68 (FIG. 12, FIG. 13), the verification units 631, 632, ..., 63n (FIG. 13), and so forth, are configured as a combination of the processor 200 and the RAM 206.

The program storage unit 202 is an example of a storage which stores programs, and is configured as a computer-readable/writable storage medium. The program storage unit 202 stores an OS 218, application programs 220, etc. Examples of the application programs 220 include the aforementioned imaging program, authentication program, etc.

The data storage unit 204 is an example of a storage device which stores data, and is configured as a recording medium. In the data storage unit 204, a registration data storage unit 222, a verification data storage unit 224, a selection data storage unit 226, etc., are provided. In the registration data storage unit 222, registration data, which is biometric information to be used to verify the verification data, is registered. The registration data storage unit 222 provides the aforementioned registration data DB 64 (FIG. 1 and FIG. 13), or registration data DBs 641, 642, ..., 64n (FIG. 12). The verification data storage unit 224 stores the verification data acquired by the authentication unit 6 via the imaging unit 46. Furthermore, the selection data storage unit 226 stores selection data such as the verification methods that correspond to the respective imaging methods, the aforementioned illumination methods that correspond to the respective imaging method, etc.

The RAM provides a work area. The operation input unit 208 is used to input information etc. A keyboard or the like is used to input information.

The position detection unit 210 detects the position of the imaging subject with respect to the imaging range of the camera 214, and is configured as the first and second photo interrupters 228 and 230. The photo interrupters 228 and 230 detect the position of the imaging subject by detecting whether or not the imaging subject interrupts the light. Also, an arrangement may be made employing ultrasonic sound or a camera image. Also, an arrangement may be made employing other position detectors.

The illumination unit 212 illuminates the imaging position of the imaging subject (body). For example, the illumination unit 212 is configured as near-infrared light sources 232 and 234, which are selected according to the imaging method.

The camera 214 is an example of the imaging unit, and is configured as a CCD, for example. The camera 214 corresponds to the imaging unit 46 (FIG. 1, FIG. 12, and FIG. 13). In this case, the camera 212 may include an exposure control component such as an aperture or the like, or a component which controls the light sensitivity, which can be adjusted or controlled according to the imaging method.

The display unit 216 displays a biometric image, authentication results, etc., and is configured as an LCD (Liquid Crystal Display), for example.

Such an arrangement provides the function units or apparatuses according to the first through sixth embodiments, thereby providing high-precision image acquisition and authentication.

Other Embodiments

In the above-described embodiments, the illumination unit may be configured as a visible light source or an ultraviolet light source, or may be configured as a single light source or multiple light sources, depending upon the imaging method. Also, in some cases, the illumination unit 212 may be configured as a point light source.

Description has been made in the above-described embodiment regarding an arrangement in which the imaging apparatus 4 and the authentication unit 6 are configured as a single device. Also, an arrangement may be made in which these components may be configured as separate devices independent of one another.

Description has been made in the above-described embodiment regarding an arrangement in which the selection of the registration data or the verification method is performed as the selection of the authentication information and/or the authentication method according to the selection of the imaging method or the biometric information. However, the registration data and/or the illumination method are not restricted to the above-described arrangements.

As described above, description has been made regarding the preferred embodiments according to the present invention. However, the present invention is not restricted to the above description. It is needless to say that various modifications and changes can be made by those skilled in this art based upon the spirit of the present invention disclosed in the claims or in the best mode of the present invention. Also, it is needless to say that such modifications and changes are encompassed in the technical scope of the present invention.

The present invention provides at least the following advantages.

Such an arrangement allows an image of a target body to be acquired using an optimum imaging method selected according to the position of the target body.

In a case in which the position of the target body can change, such an arrangement allows the images of the target body to be acquired using the respective optimum imaging methods selected according to the positions thereof, thereby providing multiple images acquired at different positions with respect to the single target body.

Such an arrangement is capable of performing authentication using a biometric image acquired using the imaging method selected according to the position of the biometric target, thereby improving the authentication precision.

Such an arrangement selects the authentication information and/or the authentication method to be used to perform authentication, according to the imaging method selected based upon the position of the biometric position, thereby improving the degree of freedom of the selection of the authentication information, and thereby improving the authentication precision.

Such an arrangement selects the authentication information and/or the authentication method to be used to perform authentication, according to the imaging method selected based upon the position of the biometric target, thereby allowing multiple biometric information obtained according to the respective positions to be used. Furthermore, such an arrangement allows the authentication information and/or the authentication method to be selected according to the biometric information. Thus, multiple authentication can be performed at once. Furthermore, the authentication can be performed based upon the authentication information selected according to selection of the position of the biometric target.

The other purposes, features, and advantages of the present invention can be more clearly understood with reference to the accompanying drawings and embodiments.

With the present invention, the authentication information and/or the authentication method used to perform authentication are selected according to the imaging method selected according to the position of the biometric target which is an example of the imaging subject, thereby allowing multiple biometric information obtained according to the respective positions to be used. Furthermore, such an arrangement allows the authentication information and/or the authentication method to be selected according to the biometric information. Thus, multiple authentications can be performed at once. Furthermore, the authentication can be performed based upon the authentication information selected according to the selection of the position of the biometric target. Thus, such an arrangement can be widely applied to image acquisition of the imaging subject, biometric authentication, and so forth, thereby providing a useful technique.

As mentioned above, the present invention has been specifically described for better understanding of the embodiments thereof and the above description does not limit other aspects of the invention. Therefore, the present invention can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An apparatus for authenticating a user comprising:
 a detector configured to determine a position of a hand of the user for biometric authentication, the detector including a first detector configured to detect a presence of the hand at a first position and a second detector configured to detect a presence of the hand at a second position that is different from the first position;
 a single camera configured to obtain biometric data from the position by using a plurality of imaging conditions corresponding to a plurality of biometric authentication algorithms, respectively; and
 a processor executing:
  selecting one or more of the biometric authentication algorithms based on the detected presence of the hand at the first and second positions; and
  authenticating the user by comparing the biometric data with reference data based on using the selected one or more biometric authentication algorithms.

2. The apparatus of claim 1, further comprising a casing for accommodating the hand.

3. The apparatus of claim 2, wherein the single camera obtains biometric data from the position by using the plurality of imaging conditions in accordance with a degree of an insertion of the hand into the casing.

4. The apparatus of claim 1, wherein
 the plurality of imaging conditions includes at least one of transparent imaging and reflection imaging, and
 the plurality of biometric authentication algorithms includes at least one of a fingerprint authentication algorithm and a vein authentication algorithm.

5. The apparatus of claim 1, wherein detection of the presence of the hand at the first position by the first detector causes the processor to select a first biometric authentication algorithm from among the one or more biometric authentication algorithms, and detection of the presence of the hand at the second position by the second detector causes the processor to select a second biometric authentication algorithm from among the one or more biometric authentication algorithms, the second biometric authentication algorithm being different than the first biometric authentication algorithm.

6. The apparatus of claim 5, wherein the detector is configured such that detection of the presence of the hand at the second position by the second detector can occur only after detection of the presence of the hand at the first position by the first detector, such that detection of the presence of the hand at the second position by the second detector causes the processor to select both the first biometric authentication algorithm and the second biometric authentication algorithm.

7. A method of controlling an apparatus for authenticating a user comprising:
  determining a position of a hand of the user for biometric authentication, the determining including detecting a presence of the hand at a first position and detecting a presence of the hand at a second position that is different from the first position;
  obtaining, using a single camera, biometric data from the position by using a plurality of imaging conditions corresponding to a plurality of biometric authentication algorithms, respectively;
  selecting one or more of the biometric authentication algorithms based on the detected presence of the hand at the first and second positions; and
  authenticating the user by comparing the biometric data with reference data based on using the selected one or more biometric authentication algorithms.

8. The method of claim 7, wherein the method further comprises providing a casing for accommodating the hand.

9. The method of claim 8, wherein the single camera obtains biometric data from the position by using the plurality of imaging conditions in accordance with a degree of an insertion of the bodily part into the casing.

10. The method of claim 7, wherein
  the plurality of imaging conditions includes at least one of transparent imaging and reflection imaging, and
  the plurality of biometric authentication algorithms includes at least one of a fingerprint authentication algorithm and a vein authentication algorithm.

11. A non-transitory computer-readable recording medium that stores a computer program for authenticating a user, by controlling an apparatus according to a process comprising:
  determining a position of a hand of the user for biometric authentication, the determining including detecting a presence of the hand at a first position and detecting a presence of the hand at a second position that is different from the first position;
  obtaining, using a single camera, biometric data from the position by using a plurality of imaging conditions corresponding to a plurality of biometric authentication algorithms, respectively;
  selecting one or more of the biometric authentication algorithms based on the detected presence of the hand at the first and second positions; and
  authenticating the user by comparing the biometric data with reference data based on using the selected one or more biometric authentication algorithms.

12. The non-transitory computer-readable recording medium of claim 11, wherein the apparatus further comprises a casing for accommodating the hand.

13. The non-transitory computer-readable recording medium of claim 12, wherein the single camera obtains biometric data from the position by using the plurality of imaging conditions in accordance with a degree of an insertion of the bodily part into the casing.

14. The non-transitory computer-readable recording medium of claim 11, wherein
  the plurality of imaging conditions includes at least one of transparent imaging and reflection imaging, and
  the plurality of biometric authentication algorithms includes at least one of a fingerprint authentication algorithm and a vein authentication algorithm.

* * * * *